United States Patent
Ignacio de Leon et al.

(10) Patent No.: US 12,255,282 B2
(45) Date of Patent: Mar. 18, 2025

(54) LITHIUM METAL RECOVERY AND SYNTHESIS

(71) Applicant: UCHICAGO ARGONNE, LLC, Chicago, IL (US)

(72) Inventors: Patricia Anne Ignacio de Leon, Westmont, IL (US); John N. Hryn, Hawthorn Woods, IL (US); Li Tang, Bolingbrook, IL (US); Edward F. Barry, Chicago, IL (US); Daniel Yoav Arenas, Chicago, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 17/690,835

(22) Filed: Mar. 9, 2022

(65) Prior Publication Data
US 2022/0200042 A1    Jun. 23, 2022

Related U.S. Application Data

(62) Division of application No. 16/145,364, filed on Sep. 28, 2018, now Pat. No. 11,296,354.

(51) Int. Cl.
| | |
|---|---|
| C25C 1/00 | (2006.01) |
| C25C 1/02 | (2006.01) |
| H01M 10/052 | (2010.01) |
| H01M 10/0561 | (2010.01) |
| C22B 26/12 | (2006.01) |

(52) U.S. Cl.
CPC ........... *H01M 10/0561* (2013.01); *C25C 1/02* (2013.01); *H01M 10/052* (2013.01); *C22B 26/12* (2013.01)

(58) Field of Classification Search
CPC ........ C25C 1/02; C22B 26/12; H01M 10/052; H01M 10/0561
See application file for complete search history.

(56) References Cited

U.S. PATENT DOCUMENTS

| | | | |
|---|---|---|---|
| 3,953,234 A | 4/1976 | Hoffmann | |
| 4,774,220 A | 9/1988 | O'Young et al. | |
| (Continued) | | | |

FOREIGN PATENT DOCUMENTS

| | | |
|---|---|---|
| CN | 106702441 A | 5/2017 |
| KR | 20200002235 A | 1/2020 |

OTHER PUBLICATIONS

Kazyak, E. et al., "Atomic Layer Deposition of the Solid Electrolyte Garnet Li7La3Zr2O12", Chem. Mater. 2017, 29, pp. 3785-3792.
(Continued)

*Primary Examiner* — Zulmariam Mendez
(74) *Attorney, Agent, or Firm* — Foley & Lardner LLP

(57) ABSTRACT

A process and system for creating a lithium ion anolyte from lithium alloys. Metal and lithium alloys are processed to remove the metal with lithium from the alloy remaining. A lithium ion anolyte formed may be used in a process to form lithium metal. Alternatively, a process and system for recovering lithium from sources such as lithium alloys and lithium metal oxides and other feedstock such as recycled batteries into a thin lithium metal film via electrodeposition in an organic electrolyte contacting both anode (holder for lithium source) and cathode (substrate for lithium deposition) in a single-compartment electrolysis cell.

7 Claims, 6 Drawing Sheets

(56) References Cited

U.S. PATENT DOCUMENTS

| | | | |
|---|---|---|---|
| 4,849,072 A | | 7/1989 | Bowman |
| 4,973,390 A | * | 11/1990 | Christini ................. C25C 7/005 |
| | | | 204/279 |
| 5,131,988 A | | 7/1992 | Peterson |
| 7,550,028 B2 | | 6/2009 | Riquet et al. |
| 8,652,690 B2 | | 2/2014 | Nunome et al. |
| 8,741,150 B2 | | 6/2014 | Chung et al. |
| 9,039,885 B1 | * | 5/2015 | Holland .................... C25B 9/19 |
| | | | 205/49 |
| 2002/0018935 A1 | | 2/2002 | Okada |
| 2005/0100793 A1 | * | 5/2005 | Jonghe ...................... C25C 1/02 |
| | | | 429/246 |
| 2005/0115841 A1 | | 6/2005 | Ozawa et al. |
| 2006/0118424 A1 | | 6/2006 | Nomura et al. |
| 2007/0062336 A1 | | 3/2007 | Riquet et al. |
| 2007/0068382 A1 | | 3/2007 | Ku et al. |
| 2009/0263707 A1 | | 10/2009 | Buckley et al. |
| 2010/0140175 A1 | | 6/2010 | Wyse et al. |
| 2012/0100056 A1 | | 4/2012 | Harrison et al. |
| 2012/0301774 A1 | | 11/2012 | Jiang et al. |
| 2013/0071755 A1 | | 3/2013 | Oguro |
| 2014/0199577 A1 | | 7/2014 | Bhavaraju |
| 2014/0246307 A1 | | 9/2014 | Dadasaheb et al. |
| 2015/0014184 A1 | | 1/2015 | Swonger |
| 2015/0132633 A1 | | 5/2015 | Joshi |
| 2015/0197830 A1 | | 7/2015 | Chon et al. |
| 2016/0164092 A1 | | 6/2016 | Stottlemyer et al. |
| 2016/0254560 A1 | | 9/2016 | Aetukuri et al. |
| 2016/0315313 A1 | | 10/2016 | Suzuki et al. |
| 2016/0351889 A1 | | 12/2016 | Swonger et al. |
| 2017/0001174 A1 | | 1/2017 | Han et al. |
| 2017/0025658 A1 | | 1/2017 | Shi et al. |
| 2017/0203256 A1 | | 7/2017 | Chen et al. |
| 2019/0190005 A1 | | 6/2019 | Lee et al. |
| 2019/0226109 A1 | | 7/2019 | Park et al. |
| 2019/0334147 A1 | | 10/2019 | Hamamoto et al. |
| 2019/0348668 A1 | | 11/2019 | Kim et al. |
| 2020/0086281 A1 | | 3/2020 | Hryn et al. |
| 2020/0353426 A1 | | 11/2020 | Kawashima et al. |
| 2022/0293929 A1 | | 9/2022 | Ito et al. |

OTHER PUBLICATIONS

Kim & Van Der Bruggen, "The use of nanoparticles in polymeric and ceramic membrane structures: Review of manufacturing procedures and performance improvement for water treatment," Environmental Pollution 158(7), pp. 2335-2349 (2010).

Liang, et al., "Polymer Nanofiber-Guided Uniform Lithium Deposition for Battery Electrodes," Nano Letters 15(5), pp. 2910-2916 (2015).

Mashtalir, et al., "High-Purity Lithium Metal Films from Aqueous Mineral Solutions," ACS Omega 3(1), pp. 181-187 (2018).

Munnik, et al., "Recent developments in the synthesis of supported catalysts," Chemical Reviews 115(14), pp. 6687-6718 (2015).

Qian, et al., "Dendrite-free Li deposition using trace-amounts of water as an electrolyte additive," Nano Energy 15, pp. 135-144, 2015.

Shah, et al., "3D printing of electrically conductive hybrid organic-inorganic composite materials," Microsystem Technologies , 5 pages (2018).

Tarascon & Armand, "Issues and challenges facing rechargeable lithium batteries," Nature 414, pp. 359-367 (2001).

US Notice of Allowance on for U.S. Appl. No. 16/145,364, dated Feb. 17, 2022.

Wilson, et al., "Recycling of aluminium-lithium process scrap," Journal de Physique Colloques 48(C3), pp. C3-75-C3-83 (1987).

Zhang & Itoh, "Extraction of metals from municipal solid waste incinerator fly ash by hydrothermal process," Journal of Hazardous Materials 136(3), pp. 663-670 (2006).

Zhang, et al., "Dendrite-free lithium deposition with self-aligned nanorod structure," Nano Letters 14, pp. 6889-6896, 2014.

Zhang, et al., "Dendrite-Free Lithium Deposition with Self-Aligned Nanorod Structure," Nano Letters 14(12), pp. 6889-6896 (2014).

Zheng, et al., "PolymerNanofiber-Guided Uniform Lithium Deposition for Battery Electrodes," Nano Letters 15, pp. 2810-2916, 2015.

He, et al., "The intrinsic behavior of lithium fluoride in solid electrolyte interphases on lithium," Proceedings of the National Academy of Sciences 117(1). pp. 73-79 (2019).

Kim, et al., "Facet selectivity of Cu current collector for Li electrodeposition," Energy Storage Materials 19, pp. 154-162 (2019).

Ma, et al., "Facile and scalable electrodeposition of copper current collectors for high-performance Li-metal batteries," Nano Energy 59, pp. 500-507 (2019).

Chang, et al., "Morphological and Chemical Mapping of Columnar Lithium Metal," Chemistry of Materials 32(7), pp. 2803-2814 (2020).

Lopez, et al., "Effects of Polymer Coatings on Electrodeposited Lithium Metal," Journal of the American Chemical Society 140 (37), pp. 11735-11744 (2018).

Stalin, et al., "Designing Polymeric Interphases for Stable Lithium Metal Deposition," Nano Letters 20(8), pp. 5749-5758 (2020).

Boulfrad, et al., "Electrochemical characterization of nanostructured zirconias," Solid State Ionics 180(14-16), pp. 978-983 (2009).

Shimonishi, et al., "Synthesis of garnet-type $Li_7-xLa_3Zr_2O_{12}-1/2x$ and its stability in aqueous solutions," Solid State Ionics 183(1), pp. 48-53 (2011).

* cited by examiner

LITHIUM METAL RECOVERY AND SYNTHESIS

CROSS-REFERENCE TO RELATED APPLICATIONS

This application is a divisional of U.S. patent application Ser. No. 16/145,364, filed on Sep. 28, 2018, which is hereby incorporated by reference in its entirety.

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to methods for extracting and synthesizing lithium, more particularly from lithium alloy feedstock.

BACKGROUND

Lithium metal usage has dramatically increased as electronic components, and batteries in particular, have become more widespread in every facet of life. Further, lithium has grown to be viewed as vital to domestic economies and defense by many nations. The wide spread use and strategic importance of lithium have pushed nations to prioritize the ability to domestically source lithium rather than rely upon traditional "mined" lithium extracted from the ground.

Lithium metal is used as an alloying component in many alloys. In particular, aluminum-lithium alloys find application as metal where weight is an important factor, as the alloy is lighter than pure aluminum. Thus, aluminum-lithium alloys are widely used in the aerospace field. This results in large-scale machines, such as aircraft and rockets, that contain massive amounts of aluminum-lithium alloy. This provides a potential source of lithium, but presents difficulties for recycling as the lithium must be extracted for both maximum value and to provide pure aluminum back for the many purposes aluminum is used for, some of which would not be compatible with lithium contamination. Existing processes exist for extraction of lithium from aluminum-lithium alloys. However, such processes demonstrate a number of problems and undesirable characteristics.

For example, one prior process utilizes high temperature electrolysis. Such processes have been described by Wilson, et al., "Recycling of aluminum-lithium process scrap" *Journal de Physique Colloques* 1987, 48 (C3), C3-75-C3-83; Riquet, et al., "Method For Recycling Aluminum-Lithium-Type Alloy Scrap," US 2007/0062336 A1, Mar. 22, 2007; and Bowman, "Electrolytic process for recovering lithium from aluminum-lithium alloy scrap," U.S. Pat. No. 4,849,072, Jul. 18, 1989.

Another type of process used for extraction of lithium relies upon chemical modification, such as chlorination or acid baths that present expensive processes that require specialized systems and result in potentially contaminated lithium or aluminum. For example, see U.S. Pat. No. 4,973,390.

A need remains for a low temperature, selective process to efficiently extract lithium from lithium alloys, particularly for the extraction of lithium that is pure and without additives or contaminates.

SUMMARY

Embodiments described herein relate generally to a method of producing a lithium ion containing anolyte. The method comprises: dispersing lithium-M powder in aqueous solvent; forming a lithium-ion aqueous solution with M dispersed therein; filtering the lithium-ion aqueous solution, removing the M; and increasing the concentration of lithium ions in the filtered lithium-ion aqueous solution. In the method, M is selected from a group consisting of a metal and a metal oxide.

Some embodiments relate to a method of producing a lithium ion containing anolyte. The method comprises dissolving lithium-M alloy in an aqueous acid bath, forming an aqueous acidic solution and removing M from the aqueous acidic solution.

Some embodiments relate to a method of producing a lithium metal from lithium feedstock, lithium-M. The method comprising: placing the lithium feedstock in a porous anode container; contacting the lithium feedstock with electrolyte, forming a cell comprising the anode and lithium feedstock and a cathode in communication with a galvanostat source; applying a current to an electrolytic cell comprising a cell having a cathode and an anode associated with an electrolyte; flowing electrons from the anode to the cathode; reducing lithium cations at the cathode; and depositing lithium metal on the cathode. In the methods, M is selected from a group consisting of a metal and a metal oxide.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1A:
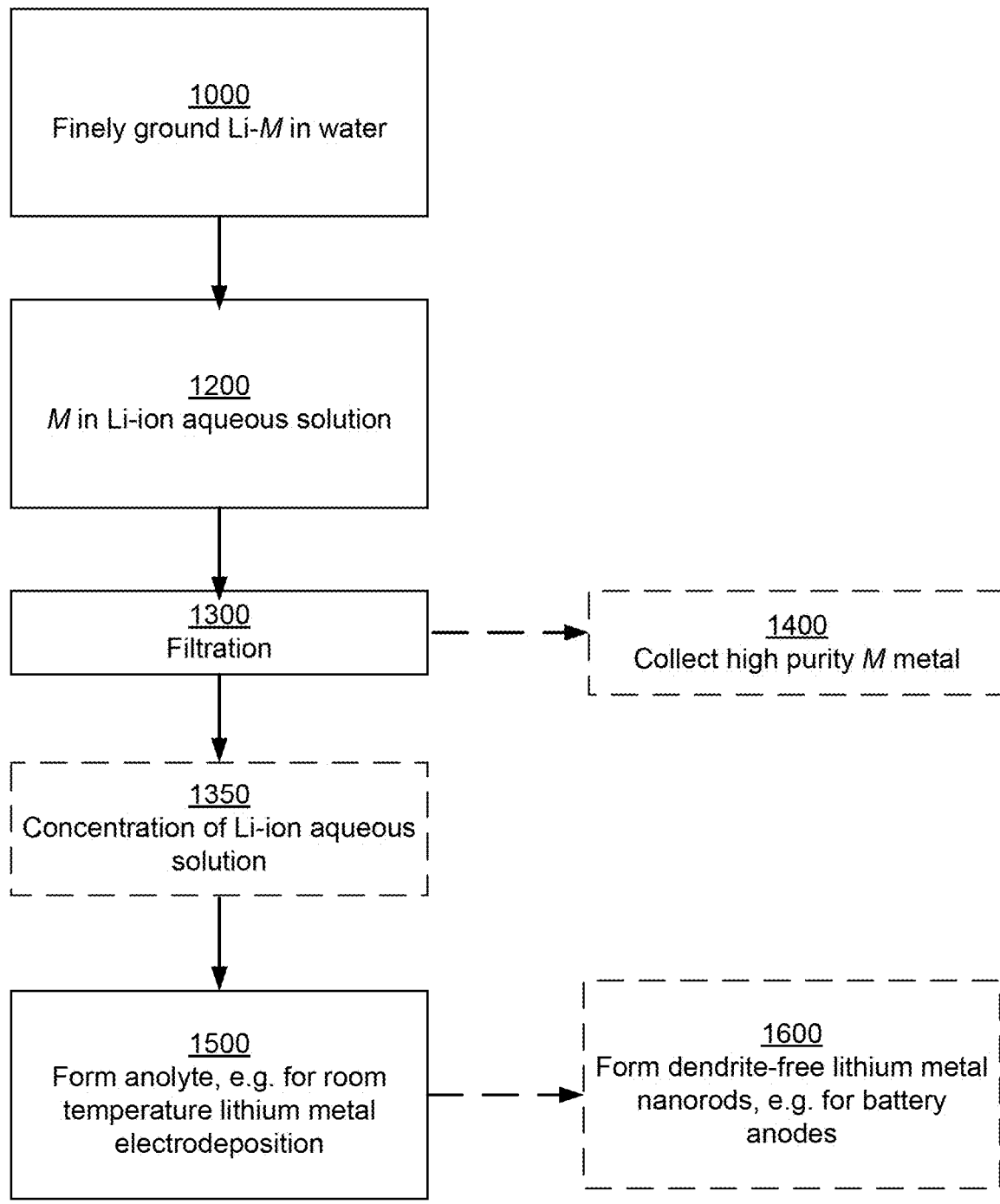
FIG. 1A illustrates one embodiment of a method for extracting lithium from lithium alloy.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to methods and systems for extracting lithium from a lithium feedstock, generally referred to herein as "Li-M", such as lithium metal or lithium oxides. While the examples described herein primarily use lithium-aluminum as the example feedstock, because lithium is the most electropositive metal, it should be appreciated that other lithium alloys and oxides may also be utilized with the methods described herein. Nonlimiting examples of feedstock lithium alloys compatible with described methods: lithium-tin (Li—Sn), lithium-antimony (Li—Sb), lithium-bismuth (Li—Bi), lithium-silicon (Li—Si), lithium-gold (Li—Au), lithium-mercury (Li—Hg), lithium-thallium (Li—Tl), lithium lead (Li—Pb), and lithium-aluminum-copper (Li—Al—Cu). Nonlimiting examples of feedstock lithium metal oxides compatible with described methods: lithium tin oxide, lithium iron oxide (LFP), lithium cobalt oxide (LCO), lithium copper oxide, lithium chromium oxides, lithium manganese oxides, lithium nickel oxides, lithium molybdenum oxides, and lithium titanium-based oxides ($TiO_2$, $Li_4Ti_5O_{12}$) and other transition metal oxides such as LLZO.

FIG. 1A illustrates one embodiment of a process for extracting lithium. Aluminum-lithium alloy is provided. In one embodiment, if the lithium feedstock If it is heavily contaminated with oils such as lubricants (which is the expected result of alloy machining during aircraft fabrication), the lithium feedstock may have to be pre-cleaned (stripping the oils off) by dipping in a quick-drying organic solvent such as hydrocarbons (e.g., n-hexane) or alcohol (e.g., ethanol). The lithium feedstock, such as aluminum-lithium alloy, may be formed as a powder. For example, a micropowder (average particle size from 1 micron to 1 mm) or a nanoparticle (average particle size 10 to 1000 nm). The lithium feedstock powder, such as aluminum-lithium alloy powder, is dispersed in water (Step 1100). In one embodiment, there are no other additives, simply the lithium feedstock. However, in certain embodiments, to eliminate lubricants and grease contaminants, surfactants such as detergents may be added to facilitate grease removal. Preferably, detergents to be used are nonionic (e.g., polyoxoethylene ethers, dodecyl maltoside, octyl glucoside, Triton-X-100) or zwitterionic (e.g., LDAO aka DDAO).

In addition, in one embodiment the mixture may be heated up to 100° C. to facilitate diffusion of lithium within the particles and dissolution into solution. A mixture of the M, such as aluminum metal, in lithium ion aqueous solution is formed (step 1200). Optionally, the mixture is filtered (step 1300) to remove the M, such as aluminum, which can then be collected as resulting high-purity material, such as aluminum metal (step 1400). The filtered solution contains lithium ions and, may contain M ions dissolved in water. Optionally, the concentration of the Li-ions in the filtered aqueous solution is increased (step 1400). Concentration may be done by passing through desalination membranes (in which case, the concentrated retentate containing the lithium ions is retained and recover pure water) and/or by thermal evaporation (may be done by membrane distillation if pure water recovery is required). Ideally, for the use of the anolyte in the described room temperature lithium electrodeposition, the lithium ion concentration in the aqueous solution is at least 1 M since typical organic electrolytes are at least 1 M in Li-ions. It will be appreciated that the aqueous solution cannot be more dilute (i.e., lower in Li-ion concentration) than the organic electrolyte—otherwise, the concentration gradient may hinder Li-ion movement from aqueous solution towards the organic catholyte.

Figure 1B:
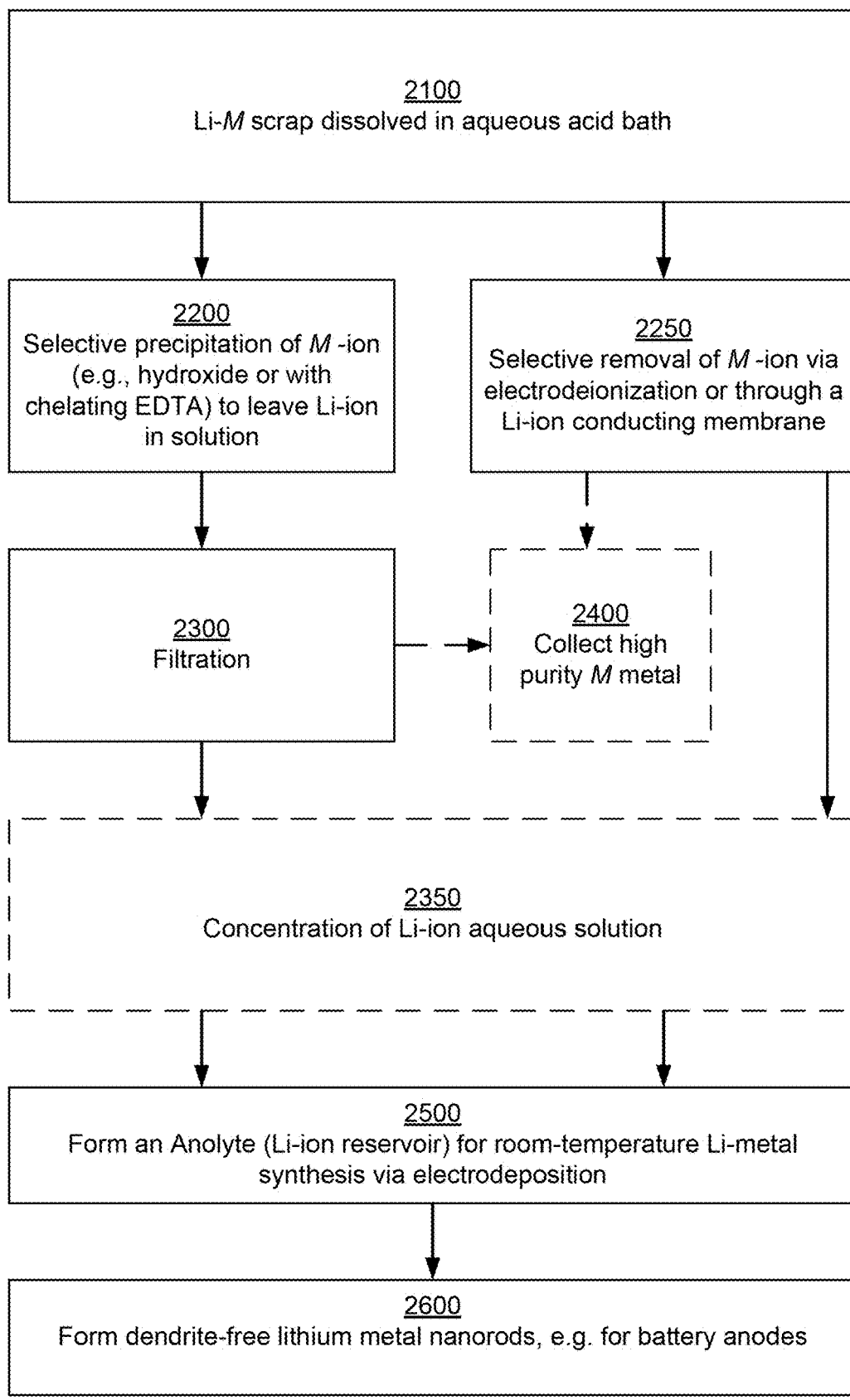
FIG. 1B illustrates a second embodiment of a method for extracting lithium from lithium alloy.
Figure 1C:
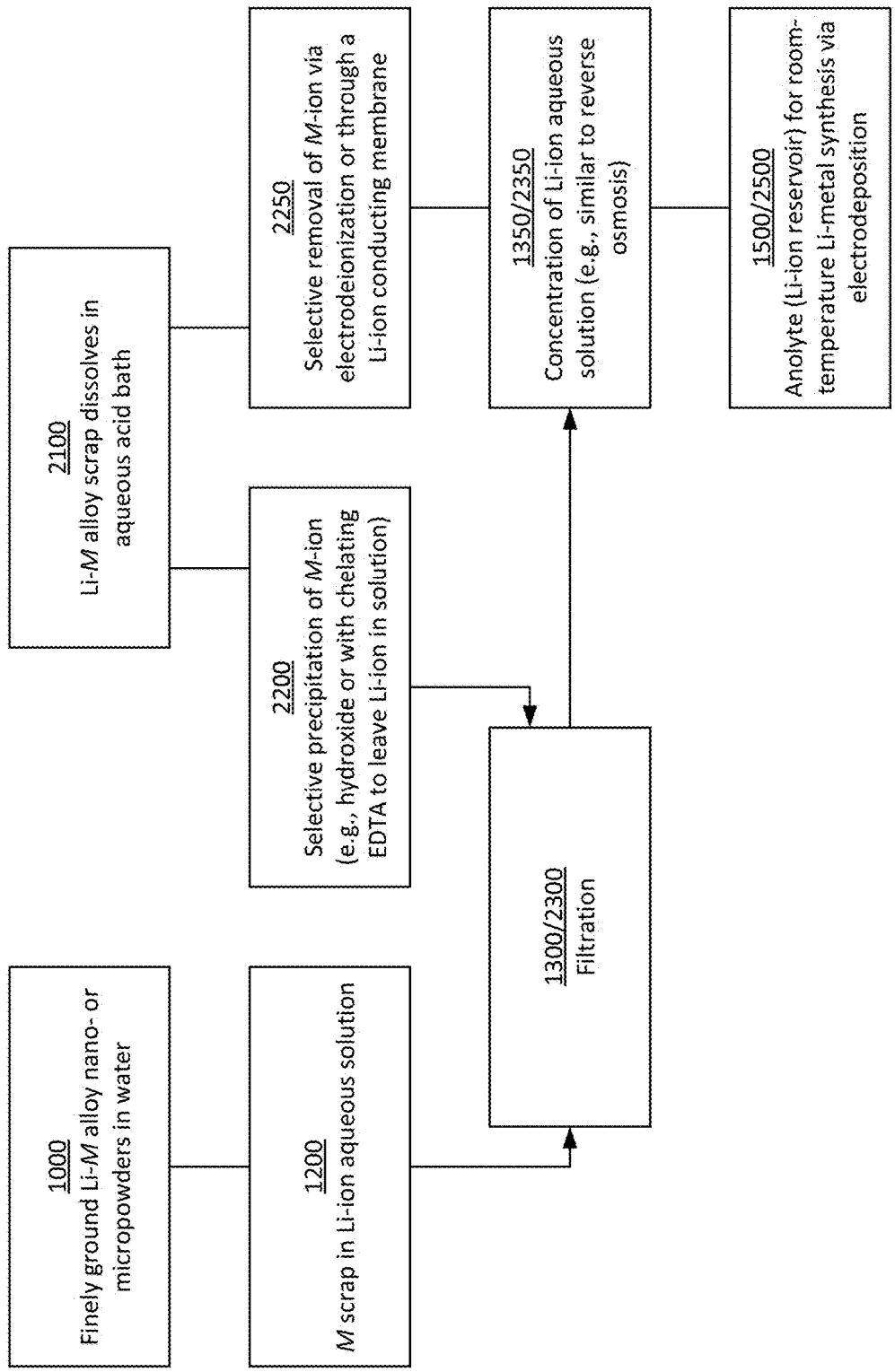
FIG. 1C illustrates a combined set of pathways for creation of an lithium anolyte from lithium-aluminum metal.

In an alternative embodiment, shown in FIG. 1B, the lithium feedstock is dissolved in an aqueous acid bath (step 2100). The acid bath may comprise mineral acids. In particular embodiments, nitric acid ($HNO_3$) and sulfuric acid ($H_2SO_4$) are preferred. Concentrations as to bring solution pH to 1-3 are preferable. Lower acid concentrations (pH 2-4) can be used if the solution is simultaneously heated up to 100° C., such as 30-100° C., 40-100° C., 50-100° C., 60-100° C., 70-100° C., 80-100° C., and 90-100° C. In one embodiment, the aqueous acid solution then either undergoes a selective precipitation of the M ion, such as the aluminum ion, from solution (step 2200) or one of selective removal of the M ion, such as the aluminum ion, by electrodeionization and/or by separating the lithium ion from the solution by Li-ion conducting membrane (step 2250). Other known separation techniques may be used, including ion exchange columns.

When the acid solution used to dissolve the feedstock is carbonic acid ($H_2CO_3$), phosphoric acid ($H_3PO_4$), acetic acid ($CH_3COOH$) and boric acid ($HBO_3$) at stoichiometric amounts to the feedstock, the M ions are separated out as insoluble solids due to acid neutralization. M ion precipitates, for example where the feedstock is lithium aluminum alloy, the precipitates include aluminum carbonate ($Al_2(CO_3)_3$), aluminum phosphate ($AlPO_4$), aluminum borate ($AlBO_3$) and aluminum acetate ($Al(CH_3COO)_3$). Where M is selectively precipitated, the precipitation comprises the use of a precipitation agent such as hydroxide, a chelating agent such as EDTA or other known precipitating agents for M. For example, for removal of Al ions via precipitation as $Al(OH)_3$ is preferentially performed by addition of aqueous ammonia ($NH_3$); otherwise, addition of strong bases such as alkali hydroxides can introduce other monovalent cations (e.g., sodium ions) that can cause impurities in the electrodeposited lithium film.

Alternatively, Al ions can be precipitated as solids of composition aluminum thiosulfate ($Al_2(S_2O_3)_3$), aluminum sulfide ($Al_2S_3$) and aluminum benzoate upon addition of precipitating agents such as thiosulfate, hydrogen sulfide and benzoic acid at near-stoichiometric amounts to the solution. If the aluminum is precipitated, the solution is preferably filtered (step 2300). In one embodiment, the filtration may include positive pressure applied on a large scale due to fouling of membranes and filters due to caking of the aluminum precipitates. Further, filtration may use rotating ceramic disk membranes where severe membrane fouling is expected. Alternatively, the acid solution may undergo selective removal M. For example, separations process that take advantage of the differences in charges of the $Al^{+3}$ and $Li^{+1}$ ions are physical processes. Electrodeionization and ion exchange columns retain Al ions more than Li ions due to its higher charge (3>1); Li-ion conducting membranes can hinder transport of bulkier and more positively charged Al ions.

Either selectively precipitated ion-solution, optionally filtered, (from step 2300) or the ion-solution with aluminum selective removed (from step 2250) may then be further treated by concentration of the Li-ions in the filtered aqueous solution is increased (step 2400). Concentration may be done by passing through desalination membranes (in which case, the concentrated retentate containing the lithium ions is retained and pure water recovered) and/or by thermal evaporation (may be done by membrane distillation if pure water recovery is required). Ideally, the lithium ion concentration in the aqueous solution is at least 1 M since typical organic electrolytes are at least 1 M in Li-ions. The aqueous solution cannot be more dilute (i.e., lower in Li-ion concentration) than the organic electrolyte—otherwise, the concentration gradient may hinder Li-ion movement from aqueous solution towards the organic catholyte. A selective removal of aluminum ions (2400) may be used to remove M metal following filtration 2300 or selective removal of ions 2250. Following the method of FIG. 1A and the method of FIG. 1B, a lithium anolyte is produced. That anolyte may then be processed using a room-temperature lithium metal synthesis electrodeposition process.

Figure 2A:
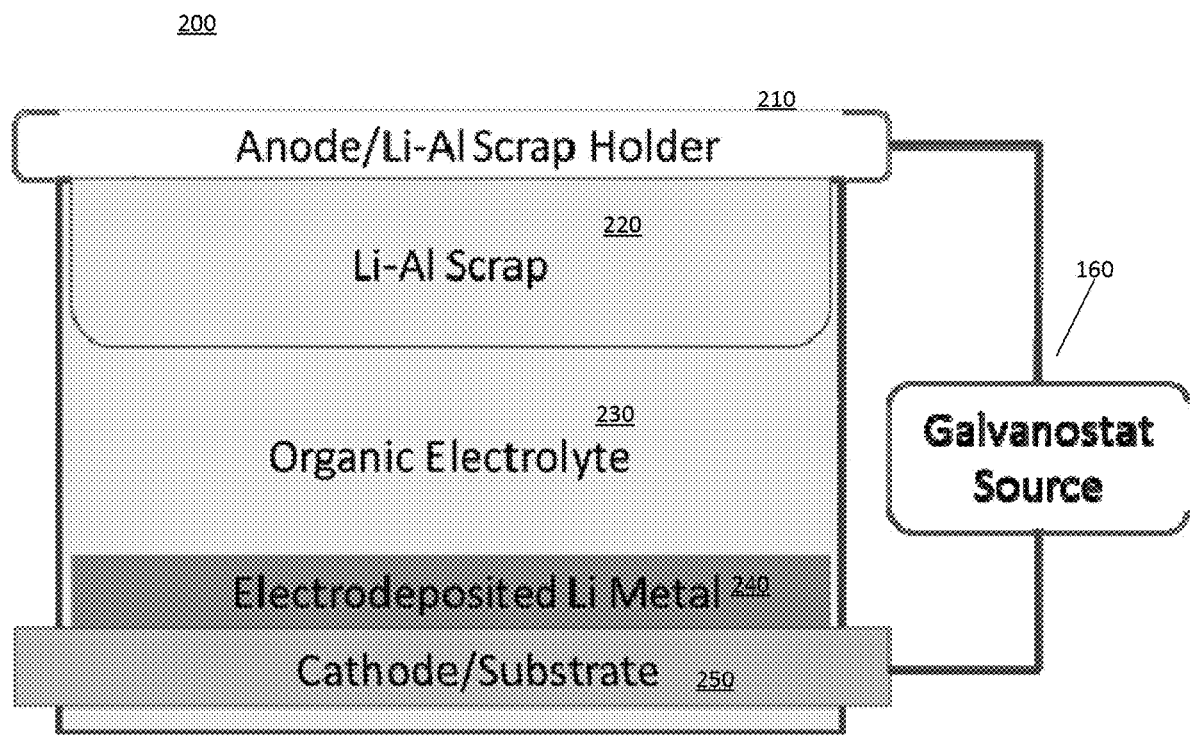
FIG. 2A illustrates a general electrodeposition apparatus in accordance with one embodiment.
Figure 2B:
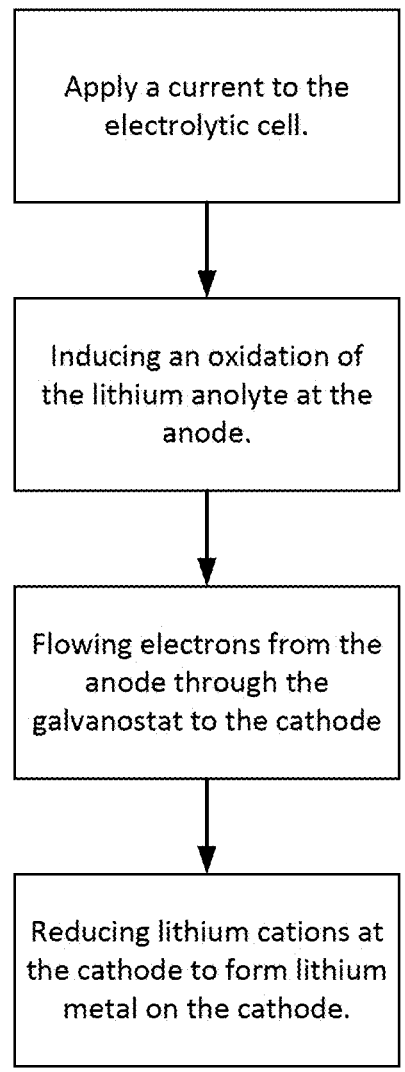
FIG. 2B illustrates one embodiment for a method for electrodeposition of lithium.

In an alternative embodiment, rather than extracting lithium from the lithium feedstock to form a lithium anolyte, the lithium feedstock is directly utilized with an anode in a electrodeposition system. FIG. 2A illustrates one such system 200 where the lithium feedstock 220, such as Li—Al alloy scrap, is placed in a metal (for example Pt or Al) basket or container 210 with porous walls (to allow electrolyte 230 to seep in and throughout) that is then immersed in an organic electrolyte. At the opposite side is a cathode 250 (e.g., copper foil) that also acts as a substrate for lithium metal deposition. A galvanostat source is connected to both the container 210 and the cathode 250. The lithium metal is extracted from by deposition from the electrolyte to form deposited lithium metal 240 on the cathode. This schematic skips the need for aqueous extraction of lithium from the Li—Al alloy. It should be noted that the system of FIG. 2A could be facilitated in either a horizontal or vertical configuration (of the anode relative to the cathode).

The lithium metal scrap provides renewable source of lithium. The electrolyte is oxidized at the anode, releasing electrons that flow through the galvanostat to the cathode. At the cathode, the lithium cations are reduced and deposited as lithium metal on the cathode. There is expected to be an optimum lithium feedstock surface area or flow rate, as the concentration of lithium ions needs to be maintained as the lithium ions are depleted from solution during deposition onto the cathode substrate.

The galvanostat 160 is provided in electrical with the cathode and electrode. The galvanostat 160 is configured to supply and, in a preferred embodiment, measure both the current applied to the electrolytic cell and the resulting full cell voltage. The anode 230 receives current from galvanostat 160. The galvanostat 160 may be provided with a reference electrode with a known electrode potential and electrolyte to provide a point of reference, such as the use of a commercially available reference immersed in the electrolyte.

In one embodiment, the method of production includes one or more process parameters. The process parameters may be controlled to provide a desired result. In one embodiment, the process parameters include cathode materials, anode materials, current density, duration of electrodeposition time, electrolyte composition, and substrate properties (including material, surface texture, and pretreatment). The described system operates in an atmosphere. In one embodiment, the cell can be operated outside of a controlled a glovebox and in ambient, as long as the electrodeposited lithium metal film is protected from air (particularly from oxygen, nitrogen, moisture and carbon dioxide) with a thin coat of non-evaporating organic solvent (e.g., by immediately dipping in propylene carbonate after electrodeposition). Lithium metal reacts with the components of air as follows: (1a) $2Li + \frac{1}{2}O_2 \rightarrow Li_2O$; (1b) $Li_2O + H_2O \rightarrow 2LiOH$; (1c) $2LiOH + CO_2 \rightarrow Li_2CO_3 + H_2O$; (2) $3Li + \frac{1}{2}N_2 \rightarrow Li_3N$.

Additional Examples of Lithium-M Feedstock

Figure 3A:
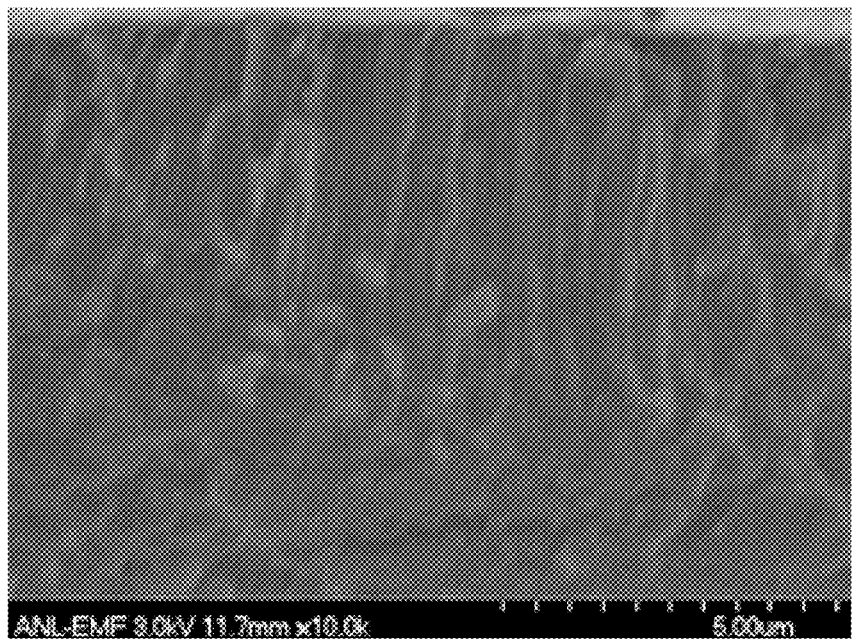
FIGS. 3A-B show Cross-section SEM images of nanostructured lithium metal on Cu foil produced by electrodeposition at a low current density of 2.5 mA/cm$^2$ wherein lithium was recovered from a lithium iron phosphate cathode from an opened jelly roll battery as a lithium recycled feedstock.
Figure 3B:
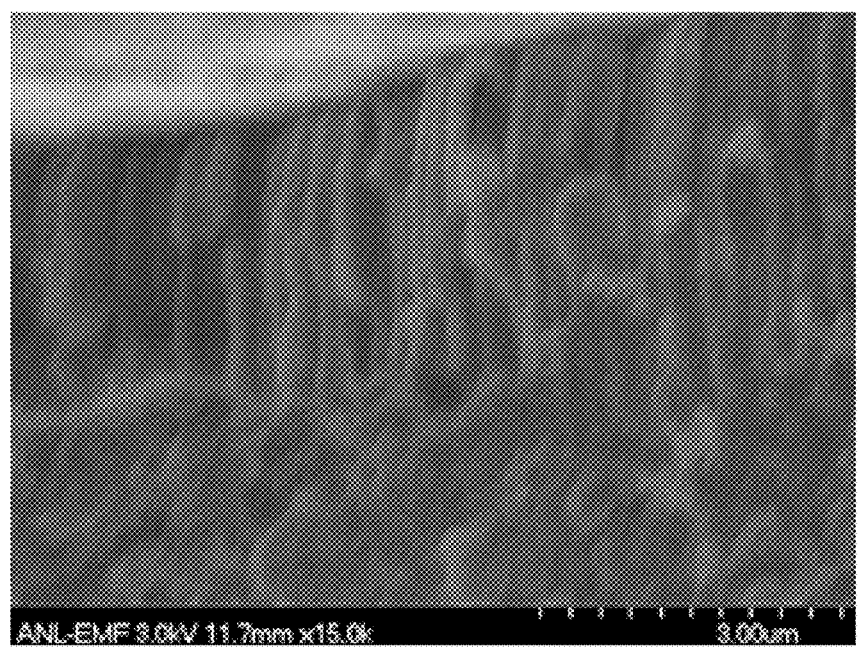

As noted above, the present methods are applicable to lithium metal and metal oxides. In addition to the examples provided regarding lithium-aluminum, experiments were performed with preliminary room-temperature electrodeposition of lithium metal onto Cu foil using recycled battery feedstock materials. Separate experiments were performed using the following materials from which lithium was recovered: (1) used cathode materials (e.g., NMC, LFP) from opened jelly roll batteries, (2) commercial lithium foil anodes from opened primary batteries, (3) spent electrolyte collected from several opened battery samples and (4) scrap samples of aluminum alloy containing up to 3% lithium. FIGS. 3A-B show a typical morphology of a thin lithium film produced via this electrodeposition recycling separations process.

In a particular experiment, a section of LFP cathode recovered from a battery is used as anode (i.e., lithium source) in our flow cell and immersed in a compartment containing organic electrolyte and with a bare Cu foil as cathode, similar to as shown in FIG. 2C. At relatively low current (typical current densities from 1-10 $mA/cm^2$), the resulting lithium thin film is dendrite-free and nanostructured (not mossy), consisting of close-packed nanorods of typical diameter 250-350 nm and lengths up to 25 um. From EDS results, is observed that, even when the recycled material is immersed in the same electrolyte compartment as the lithium film being electrodeposited, the process is very selective to the deposition of lithium metal and results in thin films of sufficient quality for use as anode in coin cell tests. Elemental analysis of the produced lithium thin film from the LFP cathode did not show any measurable amounts of contaminant iron.

Another process parameter that can be varied is the salt used as electrolyte. It has been found that various lithium salts such as lithium hexafluorophosphate ($LiPF_6$), lithium perchlorate ($LiClO_4$), lithium bisfluorosulfonimide ("LFSI"), lithium tetrafluoroborate ($LiBF_4$), and their mixtures thereof, can be dissolved in organic solvents such as acetonitrile (MeCN), dimethyl carbonate ("DMC"), ethyl methyl carbonate ("EMC"), ethylene carbonate ("EC") and propylene carbonate ("PC") to provide a catholyte that is at least 1 molar concentration in lithium ions. In general, thinner artificial SEI coatings over each individual nanorod are observed with lower concentrations of $LiPF_6$ (i.e., in mixtures with other lithium salts).

As used herein, the singular forms "a", "an," and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of producing a lithium metal from a lithium-metal alloy feedstock, the method comprising:
   removing the lithium-metal alloy feedstock from a battery, the lithium-metal alloy feedstock comprising a cathode material or an anode material;
   placing the lithium-metal alloy feedstock in a porous anode container, the lithium-metal alloy selected from a group consisting of lithium-aluminum (Li—Al), lithium-tin (Li—Sn), lithium-antimony (Li—Sb), lithium-bismuth (Li—Bi), lithium-silicon (Li—Si), lithium-gold (Li—Au), lithium-mercury (Li—Hg), lithium-thallium (Li—Tl), lithium lead (Li—Pb), lithium-aluminum-copper (Li—Al—Cu), lithium tin oxide, lithium iron oxide (LFP), lithium cobalt oxide (LCO), lithium copper oxide, lithium chromium oxides, and lithium manganese oxides;
   contacting the lithium-metal alloy feedstock with electrolyte, forming a cell comprising the anode, lithium feedstock, and a cathode in communication with a galvanostat source;
   applying a current to an electrolytic cell;
   flowing electrons from the anode to the cathode;
   reducing lithium cations at the cathode; and
   depositing lithium metal on the cathode;
   wherein the electrolyte comprises a lithium salt dissolved in an organic solvent.

2. The method of claim 1, wherein the porous anode container is platinum or aluminum.

3. The method of claim 1, wherein the lithium salt is selected from a group consisting of lithium hexafluorophosphate ($LiPF_6$), lithium perchlorate ($LiClO_4$), lithium bisfluorosulfonimide ("LFSI"), lithium tetrafluoroborate ($LiBF_4$), and mixtures thereof.

4. The method of claim 3, wherein the organic solvent is selected from a group consisting of acetonitrile (MeCN), dimethyl carbonate ("DMC"), ethyl methyl carbonate ("EMC"), ethylene carbonate ("EC") and propylene carbonate ("PC").

5. The method of claim 4, wherein the electrolyte comprises 1 molar lithium ions.

6. The method of claim 1, wherein applying the current to the electrolytic cell comprises applying a current density of about 1 $mA/cm^2$ to about 10 $mA/cm^2$.

7. The method of claim 1, wherein depositing the lithium metal on the cathode is conducted in an ambient environment and the method further comprises, after depositing the lithium metal on the cathode, dipping the lithium metal in a non-evaporating organic solvent.

* * * * *